United States Patent
ElDelgawy (10) Patent No.: US 12,198,526 B2
(45) Date of Patent: Jan. 14, 2025

(54) AIRBORNE PATHOGEN DETECTION THROUGH NETWORKED BIOSENSORS

(71) Applicant: Alarm.com Incorporated, Tysons, VA (US)

(72) Inventor: Ramy Samir Aziz ElDelgawy, Reston, VA (US)

(73) Assignee: Alarm.com Incorporated, Tysons, VA (US)

( * ) Notice: Subject to any disclaimer, the term of this patent is extended or adjusted under 35 U.S.C. 154(b) by 247 days.

(21) Appl. No.: 17/878,391

(22) Filed: Aug. 1, 2022

(65) Prior Publication Data

US 2023/0039967 A1 Feb. 9, 2023

Related U.S. Application Data (60) Provisional application No. 63/228,883, filed on Aug. 3, 2021.

(51) Int. Cl.
G08B 21/12 (2006.01)
H04W 4/38 (2018.01)

(52) U.S. Cl.
CPC .............. *G08B 21/12* (2013.01); *H04W 4/38* (2018.02); *G06F 2218/12* (2023.01)

(58) Field of Classification Search
CPC ........ G08B 21/12; G08B 13/00; G08B 19/00; G08B 19/005; G08B 21/0469; G08B 21/0476; G08B 21/0492; H04W 4/38
See application file for complete search history.

(56) References Cited

U.S. PATENT DOCUMENTS

| | | | | |
|---|---|---|---|---|
| 7,343,624 | B1* | 3/2008 | Rihn | H04L 63/145 |
| | | | | 713/188 |
| 11,056,242 | B1* | 7/2021 | Jain | G16H 10/60 |
| 11,127,506 | B1* | 9/2021 | Jain | H04W 4/021 |
| 11,264,130 | B2* | 3/2022 | Lee | G16H 80/00 |
| 11,302,448 | B1* | 4/2022 | Jain | G16H 10/60 |
| 11,322,260 | B1* | 5/2022 | Jain | H04W 4/021 |
| 11,342,051 | B1* | 5/2022 | Jain | G16H 10/60 |
| 11,398,309 | B2* | 7/2022 | Correnti | G16H 40/67 |
| 11,456,080 | B1* | 9/2022 | Jain | A61B 5/4815 |

(Continued)

OTHER PUBLICATIONS

Fronczek et al., "Biosensors for Monitoring Airborne Pathogens," Journal of Laboratory Automation, 2015, 20(4):390-410.

(Continued)

*Primary Examiner* — Hoi C Lau
(74) *Attorney, Agent, or Firm* — Fish & Richardson P.C.

(57) ABSTRACT

Methods, systems, and apparatus, including computer programs encoded on computer storage media, for pathogen detection. One of the methods includes providing, to a classifier, sensor data for a physical area, at a property, to cause the classifier to generate output data using the sensor data; receiving, from the classifier, the output data that indicates whether a pathogen was likely detected; detecting, using the output data, a likely pathogen in the physical area; determining whether to provide an alert given the detection of the likely pathogen; and in response to determining whether to provide the alert given the detection of the likely pathogen, selectively providing, to a device, the alert to cause the device to present the alert or determining to skip providing the alert.

20 Claims, 3 Drawing Sheets

(56) References Cited

U.S. PATENT DOCUMENTS

| | | | |
|---|---|---|---|
| 11,504,011 B1* | 11/2022 | Jain | G06N 5/04 |
| 11,585,799 B2* | 2/2023 | Bakhtari | G01N 33/0065 |
| 11,742,080 B2* | 8/2023 | Leinfellner | G16H 40/63 |
| | | | 705/2 |
| 11,961,614 B2* | 4/2024 | Byrne | G16H 50/30 |
| 2013/0080134 A1* | 3/2013 | Donovan | G16H 50/50 |
| | | | 703/11 |
| 2015/0100330 A1* | 4/2015 | Shpits | G16H 50/80 |
| | | | 705/2 |
| 2020/0168339 A1* | 5/2020 | Correnti | G16H 40/67 |
| 2020/0279642 A1* | 9/2020 | Lee | G16H 80/00 |
| 2021/0043330 A1* | 2/2021 | Ikeshima | G16H 50/30 |
| 2021/0134405 A1* | 5/2021 | Feng | G02B 5/32 |
| 2022/0028535 A1* | 1/2022 | Ryan | G06V 30/194 |
| 2022/0196268 A1* | 6/2022 | Goel | F24F 8/22 |
| 2022/0310269 A1* | 9/2022 | Bekanich | A61B 5/746 |
| 2022/0359086 A1* | 11/2022 | Correnti | G16H 40/20 |
| 2022/0365053 A1* | 11/2022 | Bakhtari | F24F 11/74 |
| 2022/0371394 A1* | 11/2022 | Vogt | B60H 1/00757 |
| 2023/0039967 A1* | 2/2023 | ElDelgawy | H04W 4/38 |
| 2023/0120290 A1* | 4/2023 | Baarman | G16H 50/80 |
| | | | 15/3 |
| 2023/0197289 A1* | 6/2023 | deLaubenfels | G16H 50/80 |
| | | | 705/2 |
| 2023/0215586 A1* | 7/2023 | Lin | G16H 50/80 |
| | | | 705/2 |

OTHER PUBLICATIONS

Hargis, Jr. et al., "Ultraviolet Fluorescence Detection and Identification of Protein, DNA, and Bacteria," SPIE, Feb. 10, 1995, 2366:147-153.

MacCuspie et al., "Comparison of Electrical Properties of Viruses Studied by AC Capacitance Scanning Probe Microscopy," J. Am. Chem. Soc. 2012, 130(3):887-891.

Pan et al., "Collection, Particle Sizing and Detection of Airborne Viruses," Journal of Applied Microbiology, 2019, 127:1596-1611.

* cited by examiner

AIRBORNE PATHOGEN DETECTION THROUGH NETWORKED BIOSENSORS

CROSS-REFERENCE TO RELATED APPLICATION

This application claims the benefit of U.S. Provisional Application No. 63/228,883, filed Aug. 3, 2021, the contents of which are incorporated by reference herein.

TECHNICAL FIELD

This disclosure relates generally to pathogen detection.

BACKGROUND

Pathogens may be spread through various routes. For example, pathogens may spread through direct or indirect contact with infectious secretions from a carrier or spread through aerosol transmission. Airborne pathogens may have the capability to travel at a speed of two hundred miles per hour and may travel one hundred and sixty feet or farther when aided by heating and air conditioning systems. The detection of airborne pathogens may be a challenge due to small size of the pathogens and low concentration of the pathogen in air.

SUMMARY

Techniques are described for airborne pathogen detection through networked biosensors. A network of biosensors allocated around a property may sample air and detect pathogens in the sampled air. For example, a first biosensor may detect $1.84 \times 10^3$ copies of a pathogen per cubic meter and a second biosensor may detect $3.38 \times 10^3$ copies of a pathogen per cubic meter. The biosensors may measure one or more of physical, electrical, optical, and chemical characteristics of particles in air and detect pathogens based on the measured characteristics.

The biosensors may transmit sensor data that indicates detected pathogens to a pathogen monitoring system, and the pathogen monitoring system may provide alerts to users based on the sensor data. For example, the pathogen monitoring system may alert a user that high levels of COVID-19 are being detected in a specific room. Early monitoring and detection of pathogens can help curtail the spread of certain diseases, especially the ones that affect the respiratory system.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination.

In some implementations, the method includes determining whether to provide the alert given the detection of the likely pathogen includes determining whether to provide the alert given a type of the likely pathogen.

In some implementations, the method includes determining whether to provide the alert given the detection of the likely pathogen includes determining whether to provide the alert given a concentration of the likely pathogen in the physical area.

In some implementations, the method includes detecting the likely pathogen includes: determining whether the output data satisfies one or more threshold; and in response to determining that the output data satisfies the one or more threshold, determining that the physical area likely includes a pathogen.

In some implementations, the method includes determining whether the output data satisfies the one or more threshold includes determining whether a confidence value included in the output data satisfies a confidence threshold.

In some implementations, the method includes providing the sensor data includes providing, to the classifier, the sensor data that includes at least one of a particle size, an electrical conductivity, a chemical composition, or a light transparency for a particle detected in the physical area.

In some implementations, the method includes receiving, from a sensor physically located in the physical area, the sensor data.

In some implementations, the classifier includes a neural network trained to classify a confidence of detection of different types of pathogens.

In some implementations, the method includes detecting the likely pathogen includes detecting an unknown pathogen in the physical area.

In some implementations, the method includes detecting a likely pathogen includes: detecting, using the output data, a concentration of the likely pathogen; determining, using the sensor data, one or more likely physical locations of the pathogen; determining whether the concentration satisfies a threshold; and in response to determining that the concentration satisfies the threshold for disinfection is satisfied, providing the alert to disinfect the one or more likely physical locations.

In some implementations, the method includes determining whether to provide an alert given the detection of the likely pathogen includes: determining whether a threshold for disinfection is satisfied; and in response to determining that the threshold for disinfection is satisfied, providing the alert to disinfect.

In some implementations, the method includes determining whether the threshold for disinfection is satisfied includes: determining a concentration of a pathogen from the output data; determining whether the concentration satisfies a threshold; and in response to determining that the concentration satisfies the threshold for disinfection is satisfied, providing the alert.

In some implementations, the method includes selectively providing, to a device, the alert to cause the device to present the alert or determining to skip providing the alert includes: providing the alert that includes information related to at least one of mitigation steps, symptoms, testing locations, or other public health resources.

In some implementations, the method includes including, in response to detecting a likely pathogen in the physical area, causing the performance of one or more automated actions within the property.

In some implementations, the method includes including: in response to detecting a likely pathogen in the physical area, sending, to a home monitoring system at the property, one or more instructions related to the likely pathogen.

In some implementations, the method includes including: receiving sensor data indicating a historical path of a person through an area at the property; determining, using the detection of the likely pathogen and the historical path of the person through the area at the property, a likely identity of a carrier of the likely pathogen; and providing the alert that includes the likely identity of the carrier of the likely pathogen.

The details of one or more implementations are set forth in the accompanying drawings and the description below. Other features will be apparent from the description and drawings, and from the claims.

DETAILED DESCRIPTION

Figure 1:
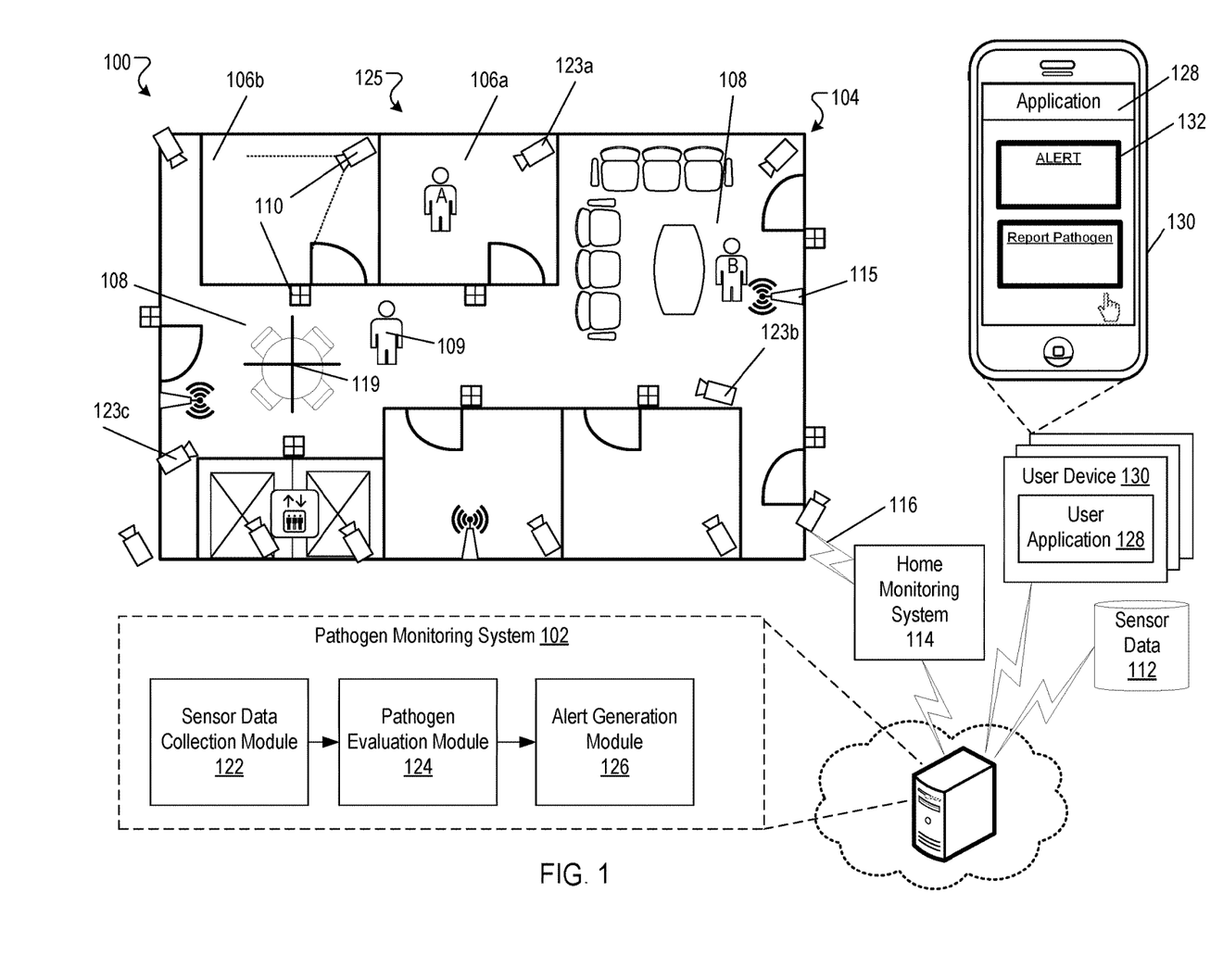
FIG. 1 is a block diagram of an example system for airborne pathogen detection through networked biosensors.

FIG. 1 is a block diagram of an example system 100 for airborne pathogen detection through networked biosensors. A property 104, e.g., a residence, multi-dwelling unit, commercial building, government building, etc., can include multiple sub-areas 106a, 106b. Each sub-area 106a can be a separate residence or commercial space, e.g., a different apartment, townhouse, business, etc., that shares a common area 108, e.g., shared hallways, staircases, lobby, entrances/exits, etc. Each residence or commercial space of the property 104 can be further divided into respective sub-areas, e.g., rooms within an apartment, or office spaces. Sub-areas 106a, 106b can each have a respective smart home or commercial system including a hub, e.g., a home monitoring system 114, where the respective home monitoring systems 114 from each sub-area 106a,b can be connected to a same service provider. Sensor data 112 that is collected, e.g., by sensors, can be shared over a network 116 to a central alarm station server which may utilize the collected sensor data 112 to perform airborne pathogen monitoring and transmit corresponding alerts.

Sub-areas 106a, 106b and common area 108 can include multiple sensors 110 that each collect respective sensor data 112 representative of pathogens in the sub-area 106a, 106b in which the particular sensor 110 is located. Sensors 110 can measure physical, electrical, optical, and chemical characteristics of particles in air. For example, some of the sensors 110 may be conductivity sensors that measure conductivity of airborne particles, some of the sensors 110 may be chemical sensors that measure reactivity of airborne particles to particular chemicals, some of the sensors 110 may be optical sensors that measure transparency of airborne particles to particular chemicals, and some of the sensors 110 may be sensors that measure physical size of airborne particles, etc.

In some implementations, the sensors 110 may include trained neural networks that receive sensed measurements as inputs and, in response, output a confidence whether pathogens are detected. For example, a trained neural network of a particle size sensor may receive particle size measurements and output confidences that the particles correspond to different pathogens, and the particle size sensor may include the confidences in sensor data that the particle size sensor provides to a pathogen monitoring system 102.

Sensors 110 can be in data communication with a home monitoring system 114 and the pathogen monitoring system 102 via a network 116. Network 116 can include one or more servers 118 that can host the home monitoring system 114 and pathogen monitoring system 102.

In some implementations, property 104 includes wireless connectivity devices 115, e.g., Wi-Fi hot-spots, Bluetooth (BT) low energy devices, etc., distributed around the property 104 and that collect connectivity data for user devices in data communication with the wireless connectivity device 115. User devices can include, for example, mobile phones, tablets, laptop computers, smart devices (e.g., smart watches), and the like. Connectivity data, e.g., strength of signal, collected by the wireless connectivity devices 115 can be utilized to track a user device as it is moved through the property 104. For example, connectivity data between a user device and multiple wireless connectivity devices 115 distributed around the property 104 can be utilized to determine a geo-path of a user of the user device. In one example, the pathogen monitoring system 102 can determine locations and duration of a person within property 104 based in part on connectivity data generated between the person's mobile phone and wireless connectivity device 115.

In some implementations, a wireless connectivity device 115 is a bluetooth low energy device, e.g., a Bluetooth (BT) beacon. A BT beacon can be a sub-component of a user device, e.g., a mobile phone, where phone-to-phone Bluetooth low energy (BLE) detection can be performed between mobile phones. Sensor data 112 can include BLE detection between user devices belonging to various users, where users of the user devices have opted into sharing the collected data with the pathogen monitoring system 102.

In some implementations, sensor 110 is a global positioning system (GPS) enabled device that is a sub-component of a user device, e.g., a GPS on a mobile phone. The GPS-enabled device can generate sensor data 112 including geolocation information, where the user may opt into sharing the collected geolocation information with the pathogen monitoring system 102. For example, a user's mobile phone includes a GPS and shared location data with the pathogen monitoring system 102. In some implementations, geolocation information for a user can be inferred from locations of the system's sensors and/or beacons. For example, the system 102 can infer a location of a user based in part on data collected from triggering of particular motion sensors, badge readers, door locks, etc. In another example, the system 102 can infer a location of a user based on connectivity data collected from one or more beacons, which is described in further detail below.

Network 116 can be configured to enable exchange of electronic communication between devices connected to the network 116. The network 116 can include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL), radio, television, cable, satellite, or any other delivery or tunneling mechanism for carrying data. Network 116 may include multiple networks or subnetworks, each of which may include, for example, a wired or wireless data pathway. Network 116 may include a circuit-switched network, a packet-switched data network, or any other network able to carry electronic communications (e.g., data or voice communications). For example, network 116 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. Network 116 may include one or more networks that include wireless data channels and wireless voice channels. Network 116 may be a wireless network, a broadband network, or a combination of networks includes a wireless network and a broadband network.

In some implementations, sensors 110 include a camera system 125. Camera system 125 includes multiple cameras 123a-c, where each camera captures at least a portion of a sub-area 106a, 106b and/or common area 108 within a field of view of the camera. Imaging data captured by camera system 125 can be provided to the pathogen monitoring system 102 over the network 116. Imaging data can be pre-processed by the camera system, for example, to identify objects/humans of interest within the collected imaging data using image processing software and video analytics.

Pathogen monitoring system 102 includes sensor data collection module 122, pathogen evaluation module 124, and alert generation module 126. Though described herein with reference to sensor data collection module 122, pathogen evaluation module 124, and alert generation module 126, the actions can be performed by more or fewer modules. The sensor data collection module 122 can receive sensor data 112 from multiple different sensors 110 associated with the property 104.

Sensor data collection module 122 can receive sensor data 112 from multiple sensors 110. Sensor data 112 can be requested by the sensor data collection module 122 and/or a sensor 110 can push sensor data 112 to the sensor data collection module, for example, at periodic intervals. For example, sensor data collection module 122 can request updated sensor data 112 from the sensor 110 at a periodic interval, e.g., every 15 minutes, every 5 minutes, every hour, etc. In another example, the sensor 110 can provide updated sensor data 112 to the sensor data collection module 122 at a periodic interval, e.g., every 10 minutes, every 30 minutes, etc.

In some implementations, sensors 110 can provide sensor data 112 in response to determining an occurrence of an exposure event 113, e.g., detecting a person at the property 104. For example, a camera 123a can detect the presence of a person walking through area 108 and provide sensor data 112 including the detection to the sensor data collection module 122.

The sensor data collection module 122 can aggregate the sensor data 112 from multiple sensors 110 including metadata for the respective sensor data 112, e.g., time/date of the data, the particular sensor 110 that generated the sensor data, location of the particular sensor. The aggregated sensor data can be provided by the sensor data collection module 112 as output to the pathogen evaluation module 124.

The pathogen evaluation module 124 can receive the aggregated sensor data 112 and determine whether an alert should be generated. For example, the pathogen evaluation module 124 may determine that the sensor data 112 indicates that COVID-19 was detected at a non-zero concentration and, in response, determine that an alert that warns about the presence of COVID-19 should be generated. In another example, the pathogen evaluation module 124 may determine that the sensor data 112 indicates that airborne mold above an unsafe concentration has been detected and, in response, determine that an alert that warns about the unsafe levels of airborne mold should be generated.

In some implementations, the pathogen evaluation module 124 may additionally or alternatively include a trained neural network that detects pathogens. For example, the sensors 110 may not include trained neural network modules and may instead provide measurements to the sensor data collection module 122, and a trained neural network module of the pathogen evaluation module 124 may receive the sensor data 112 from the sensor data collection module 122 and determine confidences that different pathogens were present near the sensors 110 based on the measurements in the sensor data 112.

In some implementations, the pathogen evaluation module 124 may determine that sensor data 112 indicates that an unknown pathogen has been detected and, in response, determine that an alert should be generated asking a user to identify the unknown pathogen. Additionally or alternatively, the pathogen evaluation module 124 may request that the sensor data collection module 122 collect additional sensor data regarding the unknown pathogen to better train the neural network to identify the pathogen. For example, in response to determining that a chemical sensor is providing measurements that indicate an unknown pathogen, the pathogen evaluation module 124 may determine that an optical sensor is near the chemical sensor and instruct the sensor data collection module 122 to request that the optical sensor also provide measurements.

In some implementations, pathogen monitoring system 102 can evaluate pathogen detections across multiple locations, e.g., multiple properties. For example, the pathogen monitoring system 102 can receive aggregated sensor data 112 from multiple locations. In some implementations, the pathogen evaluation module 124 may determine whether an alert should be generated about the spread of a certain disease within a certain area based on pathogen detections across multiple locations. Alerts about the spread of diseases may help health officials with containment measures, or vaccination recommendations. Also, alerts can be sent out to other households if a new pathogen is identified in a neighborhood.

In some implementations, the pathogen evaluation module 124 may determine an identity of the carrier of a pathogen. For example, the pathogen evaluation module 124 may determine that the person 109 may have been the source of COVID-19. The pathogen evaluation module 124 may determine the identity of the carrier of the pathogen based on video from the cameras 123 and facial recognition. For example, the pathogen evaluation module 124 may determine that COVID-19 was detected at a particular time near a particular sensor, perform facial recognition on video captured near the particular sensor from five minutes before to five minutes after the particular time, determine that the person 109 was the only person in the video and, in response, determine that an alert should be generated that COVID-19 was detected and that the person 109 may be a carrier.

The pathogen evaluation module 124 may determine the identity of the carrier of the pathogen based on other sensor data 112 such as geolocation data from a GPS device or connectivity data from wireless connectivity devices. For example, the pathogen evaluation module 124 may determine that only a single person was at the property 104 or in a sub-area based on geolocation data or connectivity data and, in response, determine that the single person is likely a carrier of the pathogen.

In some implementations, the pathogen evaluation module 124 may determine a source of a pathogen based on concentration of pathogens at different sensors 110. For example, the pathogen evaluation module 124 may determine that a concentration of COVID-19 as measured by a sensor in the sub-area 106a may be higher than the concentration of COVID-19 as measured by a sensor in a hallway or any other sensor and, in response, determine that a carrier of COVID-19 is likely in the sub-area 106a and determine to provide an alert that COVID-19 is being detected with a highest concentration in sub-area 106a.

In some implementations, the pathogen evaluation module 124 may determine whether a criteria for disinfecting is satisfied and, in response, determine to provide an alert to disinfect. For example, the pathogen evaluation module 124 may determine that a concentration of airborne mold is above $1.84 \times 10^3$ copies per cubic meter and, in response, determine to provide an alert that recommends a user disinfect the property 104 or the sub-area where the concentration was detected.

The pathogen evaluation module 124 can provide an instruction to generate an alert as output to the alert generation module 126. For example, the pathogen evaluation module 124 may provide an instruction to generate an alert that COVID-19 has been detected in the property. In another example, the pathogen evaluation module 124 may provide an instruction to generate an alert that unsafe levels of airborne mold have been detected. In yet another example, the pathogen evaluation module 124 may provide an instruction to generate an alert that indicates an unknown pathogen was detected and prompts a user to identify the pathogen.

The alert generation module 126 receives an instruction to generate an alert and generates an alert 132. An alert can be provided to a user device 130. Alert 132 can be an SMS/text, robocall, email, pop-up window on user device 130, or a notification provided in an application environment of an application 128 on user device 130, e.g., a pathogen detection application. The alert 132 can be provided to residents of the property 104 and/or to a 3rd party, e.g., a public health authority. In some implementations, the alert 132 can be provided to a management company, business owner, or other interested party, where personal details related to a carrier may be removed from the alert.

In some implementations, alert 132 can include information relation to mitigation steps responsive to the particular infection to which the person A potentially carries. Mitigation steps can include, for example, self-monitoring, methods to avoid future spread, etc. The alert 132 may include symptoms of the epidemiological event to assist the person to monitor if they themselves have contracted the infection. The alert 132 may include testing locations, and other public health resources (e.g., links to government informative webpages).

In some implementations, pathogen monitoring system 102 can utilize video analytics on collected sensor data, e.g., via biometrics, to perform real-time health monitoring of a person at property 104. A real-time risk assessment of a potentially infected person 109 can include detecting symptoms of illness, e.g., coughing, fever, etc. In response, the system 102 can provide notifications to persons who are in contact with the potentially infected person 109.

In some implementations, the pathogen monitoring system 102 can process sensor data 112, e.g., using video analytics, to determine if a person located at property 104 is participating in risky behaviors, e.g., not wearing a mask, coughing, touching their face, etc., that increase their potential risk of contracting an infection. The system can provide a real-time notification to the person including mitigation steps, e.g., a reminder to practice social distancing.

In some implementations, the pathogen monitoring system 102 may perform automated actions within the property 104 based on detection of pathogens. For example, the pathogen monitoring system 102 may determine to instruct a heating, ventilation, and air conditioning unit of the property 104 to increase airflow in a sub-area that the pathogen was detected to reduce concentration of the pathogen. In another example, the pathogen monitoring system 102 may determine to instruct a heating, ventilation, and air conditioning unit of the property 104 to increase humidity and increase heat in a sub-area that the pathogen was detected to cause the pathogen to stick to water droplets and sink to the ground or be killed by heat.

Figure 2:
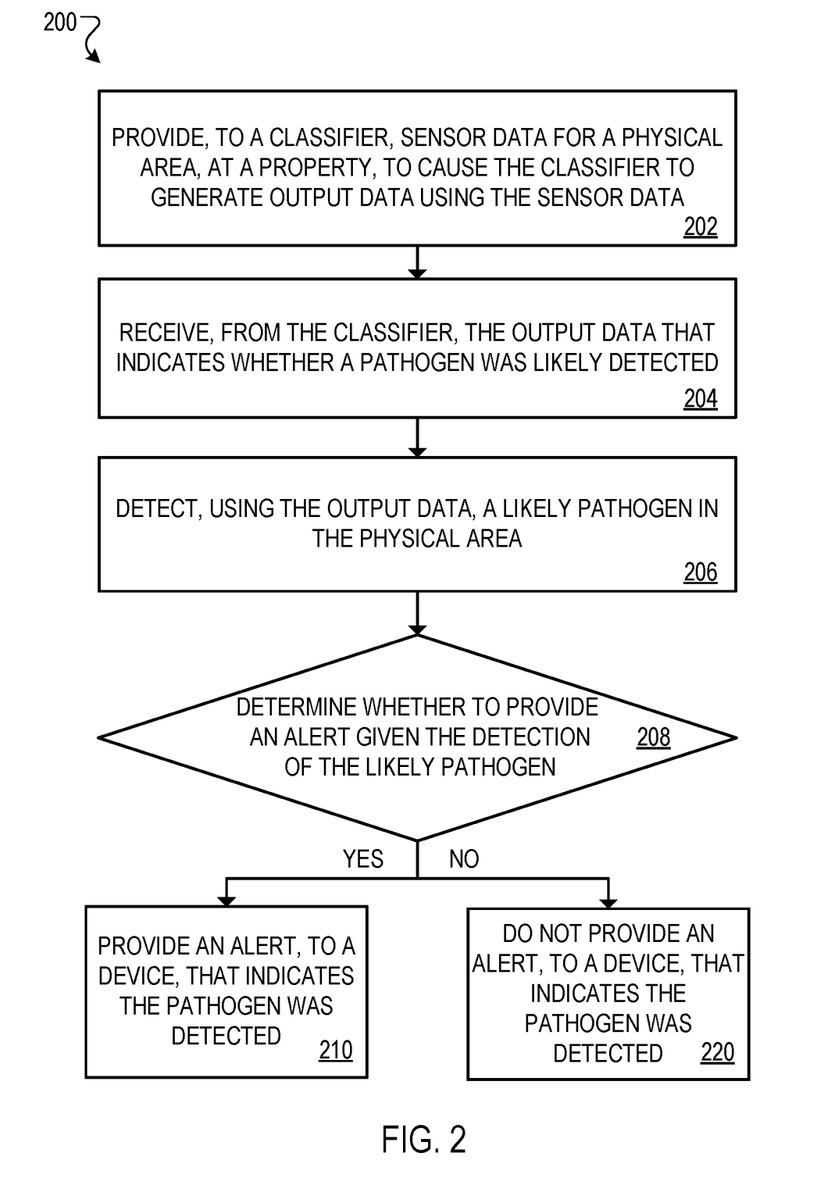
FIG. 2 is a flow diagram of an example process for airborne pathogen detection through networked biosensors.

FIG. 2 is a flow diagram of an example process 200 for airborne pathogen detection through networked biosensors. In some implementations, the process 200 may be performed by the pathogen monitoring system 102 in a central alarm station server.

The process 200 includes providing, to a classifier, sensor data for a physical area, at a property, to cause the classifier to generate output data using the sensor data (202). For example, the sensor data collection module 122 may collect measurements of particle size, electrical conductivity, chemical composition, light transparency, and other sensor data 112 from the sensors 110.

The process 200 includes receiving, from the classifier, the output data that indicates whether a pathogen was likely detected (204). For example, the sensor data collection module 122 may provide the sensor data 112 to a classifier of the pathogen evaluation module 124. In some implementations, the classifier may be a neural network that is trained to classify a confidence of detection of different types of pathogens based on one or more of particle size, electrical conductivity, chemical composition, or light transparency.

The process 200 includes detecting a pathogen based on output from the classifier (206). For example, the pathogen evaluation module 124 may receive an output that indicates a 90% confidence that $1.84 \times 10^3$ copies per cubic meter of mold have been detected and, in response, determine that mold is detected with a concentration of $1.54 \times 10^3$ copies per cubic meter. In another example, the pathogen evaluation module 124 may receive an output that indicates a 0% confidence that any non-zero concentration of COVID-19 is detected and, in response, not detect COVID-19.

The process 200 includes determining whether to provide an alert given the detection of the likely pathogen (208). For example, the pathogen evaluation module 124 may determine to provide an alert as a non-zero concentration of COVID-19 has been detected. In another example, the pathogen evaluation module 124 may determine not to provide an alert because less than a concentration of $1.84 \times 10^3$ copies per cubic meter of mold have been detected.

The process 200 includes in response to determining to provide an alert, providing the alert that indicates the detection of the likely pathogen (210). The provision can cause a device that receives the alert to present the alert. For example, the pathogen evaluation module 124 may instruct the alert generation module 126 to generate an alert. In response, the alert generation module 126 may then generate an alert that is transmitted to the user device 130. The alert can be an audible alert, a visible alert, or a combination of both.

The process 200 includes in response to determining to not provide an alert, determining to skip providing the alert (220). The pathogen monitoring system can do this given no detection of the likely pathogen. For example, the pathogen evaluation module 124 may instruct the alert generation module 126 to skip generating an alert, and the alert generation module 126 may then skip generating an alert.

In some implementations, the process 200 can alert the user that no pathogens are detected. For example, the system can be scheduled to check on a periodic basis or prompted by the user to search for pathogens. The system completes the process 200 and provides an alert indicating no pathogens are detected.

Figure 3:
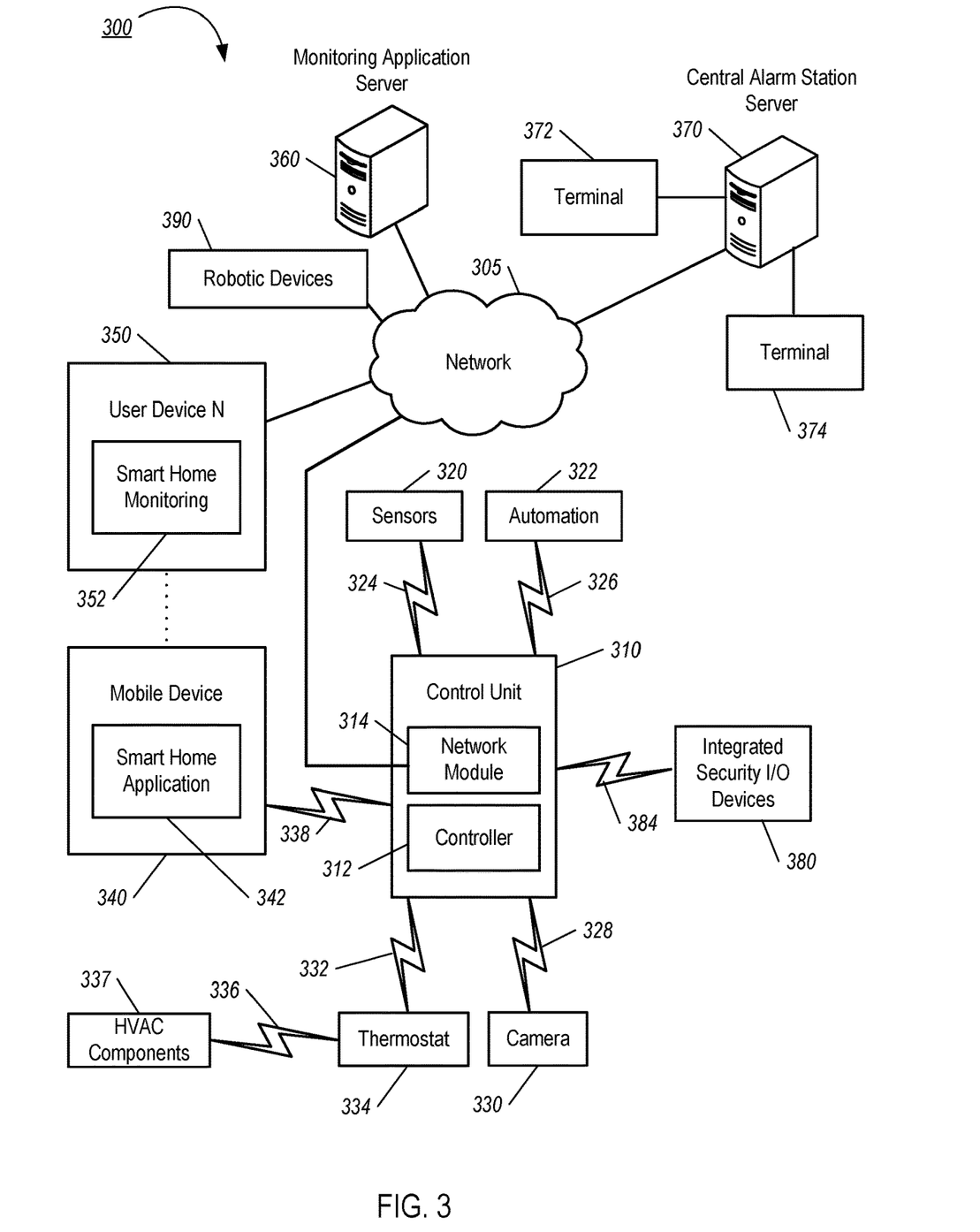
FIG. 3 shows a diagram illustrating an example home monitoring system.

FIG. 3 is a diagram illustrating an example of a home monitoring system 300. The monitoring system 300 includes a network 305, a control unit 310, one or more user devices 340 and 350, a monitoring server 360, and a central alarm station server 370. In some examples, the network 305 facilitates communications between the control unit 310, the one or more user devices 340 and 350, the monitoring server 360, and the central alarm station server 370.

The network 305 is configured to enable exchange of electronic communications between devices connected to the network 305. For example, the network 305 may be configured to enable exchange of electronic communications between the control unit 310, the one or more user devices 340 and 350, the monitoring server 360, and the central alarm station server 370. The network 305 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 305 may include multiple networks or subnetworks, each of which may include, for example, a wired or wireless data pathway. The network 305 may include a circuit-switched network, a packet-switched data network, or any other network able to carry electronic communications (e.g., data or voice communications). For example, the network 305 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 305 may include one or more networks that include wireless data channels and wireless voice channels. The network 305 may be a wireless network, a broadband network, or a combination of networks including a wireless network and a broadband network.

The control unit 310 includes a controller 312 and a network module 314. The controller 312 is configured to control a control unit monitoring system (e.g., a control unit system) that includes the control unit 310. In some examples, the controller 312 may include a processor or other control circuitry configured to execute instructions of a program that controls operation of a control unit system. In these examples, the controller 312 may be configured to receive input from sensors, flow meters, or other devices included in the control unit system and control operations of devices included in the household (e.g., speakers, lights, doors, etc.). For example, the controller 312 may be configured to control operation of the network module 314 included in the control unit 310.

The network module 314 is a communication device configured to exchange communications over the network 305. The network module 314 may be a wireless communication module configured to exchange wireless communications over the network 305. For example, the network module 314 may be a wireless communication device configured to exchange communications over a wireless data channel and a wireless voice channel. In this example, the network module 314 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 314 also may be a wired communication module configured to exchange communications over the network 305 using a wired connection. For instance, the network module 314 may be a modem, a network interface card, or another type of network interface device. The network module 314 may be an Ethernet network card configured to enable the control unit 310 to communicate over a local area network and/or the Internet. The network module 314 also may be a voice band modem configured to enable the alarm panel to communicate over the telephone lines of Plain Old Telephone Systems (POTS).

The control unit system that includes the control unit 310 includes one or more sensors. For example, the monitoring system may include multiple sensors 320. The sensors 320 may include a lock sensor, a contact sensor, a motion sensor, or any other type of sensor included in a control unit system. The sensors 320 also may include an environmental sensor, such as a temperature sensor, a water sensor, a rain sensor, a wind sensor, a light sensor, a smoke detector, a carbon monoxide detector, an air quality sensor, etc. The sensors 320 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the health-monitoring sensor can be a wearable sensor that attaches to a user in the home. The health-monitoring sensor can collect various health data, including pulse, heart rate, respiration rate, sugar or glucose level, bodily temperature, or motion data.

The sensors 320 can also include a radio-frequency identification (RFID) sensor that identifies a particular article that includes a pre-assigned RFID tag.

The control unit 310 communicates with the home automation controls 322 and a camera 330 to perform monitoring. The home automation controls 322 are connected to one or more devices that enable automation of actions in the home. For instance, the home automation controls 322 may be connected to one or more lighting systems and may be configured to control operation of the one or more lighting systems. In addition, the home automation controls 322 may be connected to one or more electronic locks at the home and may be configured to control operation of the one or more electronic locks (e.g., control Z-Wave locks using wireless communications in the Z-Wave protocol). Further, the home automation controls 322 may be connected to one or more appliances at the home and may be configured to control operation of the one or more appliances. The home automation controls 322 may include multiple modules that are each specific to the type of device being controlled in an automated manner. The home automation controls 322 may control the one or more devices based on commands received from the control unit 310. For instance, the home automation controls 322 may cause a lighting system to illuminate an area to provide a better image of the area when captured by a camera 330.

The camera 330 may be a video/photographic camera or other type of optical sensing device configured to capture images. For instance, the camera 330 may be configured to capture images of an area within a building or home monitored by the control unit 310. The camera 330 may be configured to capture single, static images of the area and also video images of the area in which multiple images of the area are captured at a relatively high frequency (e.g., thirty images per second). The camera 330 may be controlled based on commands received from the control unit 310.

The camera 330 may be triggered by several different types of techniques. For instance, a Passive Infra-Red (PIR) motion sensor may be built into the camera 330 and used to trigger the camera 330 to capture one or more images when motion is detected. The camera 330 also may include a microwave motion sensor built into the camera and used to trigger the camera 330 to capture one or more images when motion is detected. The camera 330 may have a "normally open" or "normally closed" digital input that can trigger capture of one or more images when external sensors (e.g., the sensors 320, PTR, door/window, etc.) detect motion or other events. In some implementations, the camera 330 receives a command to capture an image when external devices detect motion or another potential alarm event. The camera 330 may receive the command from the controller 312 or directly from one of the sensors 320.

In some examples, the camera 330 triggers integrated or external illuminators (e.g., Infra-Red, Z-wave controlled "white" lights, lights controlled by the home automation controls 322, etc.) to improve image quality when the scene is dark. An integrated or separate light sensor may be used to determine if illumination is desired and may result in increased image quality.

The camera 330 may be programmed with any combination of time/day schedules, system "arming state", or other variables to determine whether images should be captured or not when triggers occur. The camera 330 may enter a low-power mode when not capturing images. In this case, the camera 330 may wake periodically to check for inbound messages from the controller 312. The camera 330 may be powered by internal, replaceable batteries if located remotely from the control unit 310. The camera 330 may employ a small solar cell to recharge the battery when light is available. Alternatively, the camera 330 may be powered by the controller's 312 power supply if the camera 330 is co-located with the controller 312.

In some implementations, the camera 330 communicates directly with the monitoring server 360 over the Internet. In these implementations, image data captured by the camera 330 does not pass through the control unit 310 and the camera 330 receives commands related to operation from the monitoring server 360.

The system 300 also includes thermostat 334 to perform dynamic environmental control at the home. The thermostat 334 is configured to monitor temperature and/or energy consumption of an HVAC system associated with the thermostat 334, and is further configured to provide control of environmental (e.g., temperature) settings. In some implementations, the thermostat 334 can additionally or alternatively receive data relating to activity at a home and/or environmental data at a home, e.g., at various locations indoors and outdoors at the home. The thermostat 334 can directly measure energy consumption of the HVAC system associated with the thermostat, or can estimate energy consumption of the HVAC system associated with the thermostat 334, for example, based on detected usage of one or more components of the HVAC system associated with the thermostat 334. The thermostat 334 can communicate temperature and/or energy monitoring information to or from the control unit 310 and can control the environmental (e.g., temperature) settings based on commands received from the control unit 310.

In some implementations, the thermostat 334 is a dynamically programmable thermostat and can be integrated with the control unit 310. For example, the dynamically programmable thermostat 334 can include the control unit 310, e.g., as an internal component to the dynamically programmable thermostat 334. In addition, the control unit 310 can be a gateway device that communicates with the dynamically programmable thermostat 334. In some implementations, the thermostat 334 is controlled via one or more home automation controls 322.

A module 337 is connected to one or more components of an HVAC system associated with a home, and is configured to control operation of the one or more components of the HVAC system. In some implementations, the module 337 is also configured to monitor energy consumption of the HVAC system components, for example, by directly measuring the energy consumption of the HVAC system components or by estimating the energy usage of the one or more HVAC system components based on detecting usage of components of the HVAC system. The module 337 can communicate energy monitoring information and the state of the HVAC system components to the thermostat 334 and can control the one or more components of the HVAC system based on commands received from the thermostat 334.

In some examples, the system 300 further includes one or more robotic devices 390. The robotic devices 390 may be any type of robots that are capable of moving and taking actions that assist in home monitoring. For example, the robotic devices 390 may include drones that are capable of moving throughout a home based on automated control technology and/or user input control provided by a user. In this example, the drones may be able to fly, roll, walk, or otherwise move about the home. The drones may include helicopter type devices (e.g., quad copters), rolling helicopter type devices (e.g., roller copter devices that can fly and roll along the ground, walls, or ceiling) and land vehicle type devices (e.g., automated cars that drive around a home). In some cases, the robotic devices 390 may be devices that are intended for other purposes and merely associated with the system 300 for use in appropriate circumstances. For instance, a robotic vacuum cleaner device may be associated with the monitoring system 300 as one of the robotic devices 390 and may be controlled to take action responsive to monitoring system events.

In some examples, the robotic devices 390 automatically navigate within a home. In these examples, the robotic devices 390 include sensors and control processors that guide movement of the robotic devices 390 within the home. For instance, the robotic devices 390 may navigate within the home using one or more cameras, one or more proximity sensors, one or more gyroscopes, one or more accelerometers, one or more magnetometers, a global positioning system (GPS) unit, an altimeter, one or more sonar or laser sensors, and/or any other types of sensors that aid in navigation about a space. The robotic devices 390 may include control processors that process output from the various sensors and control the robotic devices 390 to move along a path that reaches the desired destination and avoids obstacles. In this regard, the control processors detect walls or other obstacles in the home and guide movement of the robotic devices 390 in a manner that avoids the walls and other obstacles.

In addition, the robotic devices 390 may store data that describes attributes of the home. For instance, the robotic devices 390 may store a floorplan and/or a three-dimensional model of the home that enables the robotic devices 390 to navigate the home. During initial configuration, the robotic devices 390 may receive the data describing attributes of the home, determine a frame of reference to the data (e.g., a home or reference location in the home), and navigate the home based on the frame of reference and the data describing attributes of the home. Further, initial configuration of the robotic devices 390 also may include learning of one or more navigation patterns in which a user provides input to control the robotic devices 390 to perform a specific navigation action (e.g., fly to an upstairs bedroom and spin around while capturing video and then return to a home charging base). In this regard, the robotic devices 390 may learn and store the navigation patterns such that the robotic devices 390 may automatically repeat the specific navigation actions upon a later request.

In some examples, the robotic devices 390 may include data capture and recording devices. In these examples, the robotic devices 390 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to the home and users in the home. The one or more biometric data collection tools may be configured to collect biometric samples of a person in the home with or without contact of the person. For instance, the biometric data collection tools may include a fingerprint scanner, a hair sample collection tool, a skin cell collection tool, and/or any other tool that allows the robotic devices 390 to take and store a biometric sample that can be used to identify the person (e.g., a biometric sample with DNA that can be used for DNA testing).

In some implementations, the robotic devices 390 may include output devices. In these implementations, the robotic devices 390 may include one or more displays, one or more speakers, and/or any type of output devices that allow the robotic devices 390 to communicate information to a nearby user.

The robotic devices 390 also may include a communication module that enables the robotic devices 390 to communicate with the control unit 310, each other, and/or other devices. The communication module may be a wireless communication module that allows the robotic devices 390 to communicate wirelessly. For instance, the communication module may be a Wi-Fi module that enables the robotic devices 390 to communicate over a local wireless network at the home. The communication module further may be a 900 MHz wireless communication module that enables the robotic devices 390 to communicate directly with the control unit 310. Other types of short-range wireless communication protocols, such as Bluetooth, Bluetooth LE, Z-wave, Zigbee, etc., may be used to allow the robotic devices 390 to communicate with other devices in the home. In some implementations, the robotic devices 390 may communicate with each other or with other devices of the system 300 through the network 305.

The robotic devices 390 further may include processor and storage capabilities. The robotic devices 390 may include any suitable processing devices that enable the robotic devices 390 to operate applications and perform the actions described throughout this disclosure. In addition, the robotic devices 390 may include solid-state electronic storage that enables the robotic devices 390 to store applications, configuration data, collected sensor data, and/or any other type of information available to the robotic devices 390.

The robotic devices 390 are associated with one or more charging stations. The charging stations may be located at predefined home base or reference locations in the home. The robotic devices 390 may be configured to navigate to the charging stations after completion of tasks needed to be performed for the monitoring system 300. For instance, after completion of a monitoring operation or upon instruction by the control unit 310, the robotic devices 390 may be configured to automatically fly to and land on one of the charging stations. In this regard, the robotic devices 390 may automatically maintain a fully charged battery in a state in which the robotic devices 390 are ready for use by the monitoring system 300.

The charging stations may be contact based charging stations and/or wireless charging stations. For contact based charging stations, the robotic devices 390 may have readily accessible points of contact that the robotic devices 390 are capable of positioning and mating with a corresponding contact on the charging station. For instance, a helicopter type robotic device may have an electronic contact on a portion of its landing gear that rests on and mates with an electronic pad of a charging station when the helicopter type robotic device lands on the charging station. The electronic contact on the robotic device may include a cover that opens to expose the electronic contact when the robotic device is charging and closes to cover and insulate the electronic contact when the robotic device is in operation.

For wireless charging stations, the robotic devices 390 may charge through a wireless exchange of power. In these cases, the robotic devices 390 need only locate themselves closely enough to the wireless charging stations for the wireless exchange of power to occur. In this regard, the positioning needed to land at a predefined home base or reference location in the home may be less precise than with a contact based charging station. Based on the robotic devices 390 landing at a wireless charging station, the wireless charging station outputs a wireless signal that the robotic devices 390 receive and convert to a power signal that charges a battery maintained on the robotic devices 390.

In some implementations, each of the robotic devices 390 has a corresponding and assigned charging station such that the number of robotic devices 390 equals the number of charging stations. In these implementations, the robotic devices 390 always navigate to the specific charging station assigned to that robotic device. For instance, a first robotic device may always use a first charging station and a second robotic device may always use a second charging station.

In some examples, the robotic devices 390 may share charging stations. For instance, the robotic devices 390 may use one or more community charging stations that are capable of charging multiple robotic devices 390. The community charging station may be configured to charge multiple robotic devices 390 in parallel. The community charging station may be configured to charge multiple robotic devices 390 in serial such that the multiple robotic devices 390 take turns charging and, when fully charged, return to a predefined home base or reference location in the home that is not associated with a charger. The number of community charging stations may be less than the number of robotic devices 390.

In addition, the charging stations may not be assigned to specific robotic devices 390 and may be capable of charging any of the robotic devices 390. In this regard, the robotic devices 390 may use any suitable, unoccupied charging station when not in use. For instance, when one of the robotic devices 390 has completed an operation or is in need of battery charge, the control unit 310 references a stored table of the occupancy status of each charging station and instructs the robotic device to navigate to the nearest charging station that is unoccupied.

The system 300 further includes one or more integrated security devices 380. The one or more integrated security devices may include any type of device used to provide alerts based on received sensor data. For instance, the one or more control units 310 may provide one or more alerts to the one or more integrated security input/output devices 380. Additionally, the one or more control units 310 may receive one or more sensor data from the sensors 320 and determine whether to provide an alert to the one or more integrated security input/output devices 380.

The sensors 320, the home automation controls 322, the camera 330, the thermostat 334, and the integrated security devices 380 may communicate with the controller 312 over communication links 324, 326, 328, 332, 338, and 384. The communication links 324, 326, 328, 332, 338, and 384 may be a wired or wireless data pathway configured to transmit signals from the sensors 320, the home automation controls 322, the camera 330, the thermostat 334, and the integrated security devices 380 to the controller 312. The sensors 320, the home automation controls 322, the camera 330, the thermostat 334, and the integrated security devices 380 may continuously transmit sensed values to the controller 312, periodically transmit sensed values to the controller 312, or transmit sensed values to the controller 312 in response to a change in a sensed value.

The communication links 324, 326, 328, 332, 338, and 384 may include a local network. The sensors 320, the home automation controls 322, the camera 330, the thermostat 334, and the integrated security devices 380, and the controller 312 may exchange data and commands over the local network. The local network may include 802.11 "Wi-Fi" wireless Ethernet (e.g., using low-power Wi-Fi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring server 360 is an electronic device configured to provide monitoring services by exchanging electronic communications with the control unit 310, the one or more user devices 340 and 350, and the central alarm station server 370 over the network 305. For example, the monitoring server 360 may be configured to monitor events generated by the control unit 310. In this example, the monitoring server 360 may exchange electronic communications with the network module 314 included in the control unit 310 to receive information regarding events detected by the control unit 310. The monitoring server 360 also may receive information regarding events from the one or more user devices 340 and 350.

In some examples, the monitoring server 360 may route alert data received from the network module 314 or the one or more user devices 340 and 350 to the central alarm station server 370. For example, the monitoring server 360 may transmit the alert data to the central alarm station server 370 over the network 305.

The monitoring server 360 may store sensor and image data received from the monitoring system and perform analysis of sensor and image data received from the monitoring system. Based on the analysis, the monitoring server 360 may communicate with and control aspects of the control unit 310 or the one or more user devices 340 and 350.

The monitoring server 360 may provide various monitoring services to the system 300. For example, the monitoring server 360 may analyze the sensor, image, and other data to determine an activity pattern of a resident of the home monitored by the system 300. In some implementations, the monitoring server 360 may analyze the data for alarm conditions or may determine and perform actions at the home by issuing commands to one or more of the controls 322, possibly through the control unit 310.

The monitoring server 360 can be configured to provide information (e.g., activity patterns) related to one or more residents of the home monitored by the system 300. For example, one or more of the sensors 320, the home automation controls 322, the camera 330, the thermostat 334, and the integrated security devices 380 can collect data related to a resident including location information (e.g., if the resident is home or is not home) and provide location information to the thermostat 334.

The central alarm station server 370 is an electronic device configured to provide alarm monitoring service by exchanging communications with the control unit 310, the one or more user devices 340 and 350, and the monitoring server 360 over the network 305. For example, the central alarm station server 370 may be configured to monitor alerting events generated by the control unit 310. In this example, the central alarm station server 370 may exchange communications with the network module 314 included in the control unit 310 to receive information regarding alerting events detected by the control unit 310. The central alarm station server 370 also may receive information regarding alerting events from the one or more user devices 340 and 350 and/or the monitoring server 360.

The central alarm station server 370 is connected to multiple terminals 372 and 374. The terminals 372 and 374 may be used by operators to process alerting events. For example, the central alarm station server 370 may route alerting data to the terminals 372 and 374 to enable an operator to process the alerting data. The terminals 372 and 374 may include general-purpose computers (e.g., desktop personal computers, workstations, or laptop computers) that are configured to receive alerting data from a server in the central alarm station server 370 and render a display of information based on the alerting data. For instance, the controller 312 may control the network module 314 to transmit, to the central alarm station server 370, alerting data indicating that a sensor 320 detected motion from a motion sensor via the sensors 320. The central alarm station server 370 may receive the alerting data and route the alerting data to the terminal 372 for processing by an operator associated with the terminal 372. The terminal 372 may render a display to the operator that includes information associated with the alerting event (e.g., the lock sensor data, the motion sensor data, the contact sensor data, etc.) and the operator may handle the alerting event based on the displayed information.

In some implementations, the terminals 372 and 374 may be mobile devices or devices designed for a specific function. Although FIG. 3 illustrates two terminals for brevity, actual implementations may include more (and, perhaps, many more) terminals.

The one or more authorized user devices 340 and 350 are devices that host and display user interfaces. For instance, the user device 340 is a mobile device that hosts or runs one or more native applications (e.g., the home monitoring application 342). The user device 340 may be a cellular phone or a non-cellular locally networked device with a display. The user device 340 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 340 may perform functions unrelated to the monitoring system, such as placing personal telephone calls, playing music, playing video, displaying pictures, browsing the Internet, maintaining an electronic calendar, etc.

The user device 340 includes a home monitoring application 352. The home monitoring application 342 refers to a software/firmware program running on the corresponding mobile device that enables the user interface and features described throughout. The user device 340 may load or install the home monitoring application 342 based on data received over a network or data received from local media. The home monitoring application 342 runs on mobile devices platforms, such as iPhone, iPod touch, Blackberry, Google Android, Windows Mobile, etc. The home monitoring application 342 enables the user device 340 to receive and process image and sensor data from the monitoring system.

The user device 340 may be a general-purpose computer (e.g., a desktop personal computer, a workstation, or a laptop computer) that is configured to communicate with the monitoring server 360 and/or the control unit 310 over the network 305. The user device 340 may be configured to display a smart home user interface for the home monitoring application 352 that is generated by the user device 340 or generated by the monitoring server 360. For example, the user device 340 may be configured to display a user interface (e.g., a web page) provided by the monitoring server 360 that enables a user to perceive images captured by the camera 330 and/or reports related to the monitoring system. Although FIG. 3 illustrates two user devices for brevity, actual implementations may include more (and, perhaps, many more) or fewer user devices.

In some implementations, the one or more user devices 340 and 350 communicate with and receive monitoring system data from the control unit 310 using the communication link 338. For instance, the one or more user devices 340 and 350 may communicate with the control unit 310 using various local wireless protocols such as Wi-Fi, Bluetooth, Z-wave, Zigbee, HomePlug (ethernet over power line), or wired protocols such as Ethernet and USB, to connect the one or more user devices 340 and 350 to local security and automation equipment. The one or more user devices 340 and 350 may connect locally to the monitoring system and its sensors and other devices. The local connection may improve the speed of status and control communications because communicating through the network 305 with a remote server (e.g., the monitoring server 360) may be significantly slower.

Although the one or more user devices 340 and 350 are shown as communicating with the control unit 310, the one or more user devices 340 and 350 may communicate directly with the sensors and other devices controlled by the control unit 310. In some implementations, the one or more user devices 340 and 350 replace the control unit 310 and perform the functions of the control unit 310 for local monitoring and long range/offsite communication.

In other implementations, the one or more user devices 340 and 350 receive monitoring system data captured by the control unit 310 through the network 305. The one or more user devices 340, 350 may receive the data from the control unit 310 through the network 305 or the monitoring server 360 may relay data received from the control unit 310 to the one or more user devices 340 and 350 through the network 305. In this regard, the monitoring server 360 may facilitate communication between the one or more user devices 340 and 350 and the monitoring system.

In some implementations, the one or more user devices 340 and 350 may be configured to switch whether the one or more user devices 340 and 350 communicate with the control unit 310 directly (e.g., through link 338) or through the monitoring server 360 (e.g., through network 305) based on a location of the one or more user devices 340 and 350. For instance, when the one or more user devices 340 and 350 are located close to the control unit 310 and in range to communicate directly with the control unit 310, the one or more user devices 340 and 350 use direct communication. When the one or more user devices 340 and 350 are located far from the control unit 310 and not in range to communicate directly with the control unit 310, the one or more user devices 340 and 350 use communication through the monitoring server 360.

Although the one or more user devices 340 and 350 are shown as being connected to the network 305, in some implementations, the one or more user devices 340 and 350 are not connected to the network 305. In these implementations, the one or more user devices 340 and 350 communicate directly with one or more of the monitoring system components and no network (e.g., Internet) connection or reliance on remote servers is needed.

In some implementations, the one or more user devices 340 and 350 are used in conjunction with only local sensors and/or local devices in a house. In these implementations, the system 300 includes the one or more user devices 340 and 350, the sensors 320, the home automation controls 322, the camera 330, and the robotic devices 390. The one or more user devices 340 and 350 receive data directly from the sensors 320, the home automation controls 322, the camera 330, and the robotic devices 390, and sends data directly to the sensors 320, the home automation controls 322, the camera 330, and the robotic devices 390. The one or more user devices 340, 350 provide the appropriate interfaces/processing to provide visual surveillance and reporting.

In other implementations, the system 300 further includes network 305 and the sensors 320, the home automation controls 322, the camera 330, the thermostat 334, and the robotic devices 390, and are configured to communicate sensor and image data to the one or more user devices 340 and 350 over network 305 (e.g., the Internet, cellular network, etc.). In yet another implementation, the sensors 320, the home automation controls 322, the camera 330, the thermostat 334, and the robotic devices 390 (or a component, such as a bridge/router) are intelligent enough to change the communication pathway from a direct local pathway when the one or more user devices 340 and 350 are in close physical proximity to the sensors 320, the home automation controls 322, the camera 330, the thermostat 334, and the robotic devices 390 to a pathway over network 305 when the one or more user devices 340 and 350 are farther from the sensors 320, the home automation controls 322, the camera 330, the thermostat 334, and the robotic devices 390.

In some examples, the system leverages GPS information from the one or more user devices 340 and 350 to determine whether the one or more user devices 340 and 350 are close enough to the sensors 320, the home automation controls 322, the camera 330, the thermostat 334, and the robotic devices 390 to use the direct local pathway or whether the one or more user devices 340 and 350 are far enough from the sensors 320, the home automation controls 322, the camera 330, the thermostat 334, and the robotic devices 390 that the pathway over network 305 is required.

In other examples, the system leverages status communications (e.g., pinging) between the one or more user devices 340 and 350 and the sensors 320, the home automation controls 322, the camera 330, the thermostat 334, and the robotic devices 390 to determine whether communication using the direct local pathway is possible. If communication using the direct local pathway is possible, the one or more user devices 340 and 350 communicate with the sensors 320, the home automation controls 322, the camera 330, the thermostat 334, and the robotic devices 390 using the direct local pathway. If communication using the direct local pathway is not possible, the one or more user devices 340 and 350 communicate with the sensors 320, the home automation controls 322, the camera 330, the thermostat 334, and the robotic devices 390 using the pathway over network 305.

In some implementations, the system 300 provides end users with access to images captured by the camera 330 to aid in decision making. The system 300 may transmit the images captured by the camera 330 over a wireless WAN network to the user devices 340 and 350. Because transmission over a wireless WAN network may be relatively expensive, the system 300 can use several techniques to reduce costs while providing access to significant levels of useful visual information (e.g., compressing data, down-sampling data, sending data only over inexpensive LAN connections, or other techniques).

In some implementations, a state of the monitoring system and other events sensed by the monitoring system may be used to enable/disable video/image recording devices (e.g., the camera 330). In these implementations, the camera 330 may be set to capture images on a periodic basis when the alarm system is armed in an "away" state, but set not to capture images when the alarm system is armed in a "home" state or disarmed. In addition, the camera 330 may be triggered to begin capturing images when the alarm system detects an event, such as an alarm event, a door-opening event for a door that leads to an area within a field of view of the camera 330, or motion in the area within the field of view of the camera 330. In other implementations, the camera 330 may capture images continuously, but the captured images may be stored or transmitted over a network when needed.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device.

Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A computer-implemented method comprising:
receiving sensor data representing a chemical composition of an airborne particle detected within a physical area;
providing, to a classifier, the sensor data to cause the classifier to generate output data that indicates whether the airborne particle is likely a pathogen in the physical area and a type of the pathogen;
receiving, from the classifier, the output data that indicates whether the airborne particle is likely a pathogen and a type of the pathogen;
determining whether to provide an alert using the output data that indicates the type of the pathogen; and
in response to determining whether to provide the alert, selectively providing, to a device, the alert to cause the device to present the alert or determining to skip providing the alert.

2. The method of claim 1, wherein determining whether to provide the alert using the output data that indicates the type of the pathogen comprises determining whether to provide the alert given a concentration of the pathogen in the physical area.

3. The method of claim 1, comprising:
determining whether the output data satisfies one or more threshold; and
in response to determining that the output data satisfies the one or more threshold,
determining that the physical area likely includes a pathogen.

4. The method of claim 1, wherein providing the sensor data comprises providing, to the classifier, the sensor data that includes at least one of an electrical conductivity, or a light transparency for a particle detected in the physical area.

5. The method of claim 1, wherein the classifier comprises a neural network trained to classify a confidence of detection of different types of pathogens.

6. The method of claim 1, wherein:
receiving the output data comprises receiving the output data that indicates that the type of the pathogen is unknown; and
selectively providing the alert or determining to skip providing the alert comprises providing information about the unknown pathogen in the physical area and a request for identification of the unknown pathogen.

7. The method of claim 1, comprising:
detecting, using the output data, a concentration of the likely pathogen;
determining, using the sensor data, one or more likely physical locations of the pathogen;
determining whether the concentration satisfies a threshold; and
in response to determining that the concentration satisfies the threshold for disinfection is satisfied, providing the alert to disinfect the one or more likely physical locations.

8. The method of claim 1, comprising
determining whether a threshold for disinfection is satisfied; and
in response to determining that the threshold for disinfection is satisfied, providing the alert to disinfect.

9. The method of claim 8, wherein determining whether the threshold for disinfection is satisfied comprises:
determining a concentration of a pathogen from the output data;
determining whether the concentration satisfies a threshold; and
in response to determining that the concentration satisfies the threshold for disinfection is satisfied, providing the alert.

10. The method of claim 1, wherein selectively providing, to a device, the alert to cause the device to present the alert or determining to skip providing the alert comprises:
providing the alert that comprises information related to at least one of mitigation steps, symptoms, testing locations, or other public health resources.

11. The method of claim 1, comprising, in response to detecting a likely pathogen in the physical area, causing performance of one or more automated actions.

12. The method of claim 1, comprising:
receiving sensor data indicating a historical path of a person through an area;
determining, using the output data and the sensor data indicating the historical path of the person through the area, a likely identity of a carrier of the pathogen; and
providing the alert that includes the likely identity of the carrier of the pathogen.

13. A system comprising one or more computers and one or more storage devices on which are stored instructions that are operable, when executed by the one or more computers, to cause the one or more computers to perform operations comprising:
receiving sensor data representing a chemical composition of an airborne particle detected within a physical area;
providing, to a classifier, the sensor data, to cause the classifier to generate output data that indicates whether the airborne particle is likely a pathogen in the physical area and a type of the pathogen;
receiving, from the classifier, the output data that indicates whether the airborne particle is likely a pathogen and a type of the pathogen;
determining whether to provide an alert using the output data that indicates the type of the pathogen; and
in response to determining whether to provide the alert, selectively providing, to a device, the alert to cause the device to present the alert or determining to skip providing the alert.

14. The system of claim 13, wherein determining whether to provide an alert using the output data that indicates the type of the pathogen comprises-determining whether to provide the alert given a type of the pathogen.

15. A non-transitory computer storage medium encoded with instructions that, when executed by one or more computers, cause the one or more computers to perform operations comprising:
for each of two or more airborne particles each of which is detected in a corresponding physical area:
receiving sensor data representing a chemical composition and a light transparency of the airborne particle for the physical area;
providing, to a classifier that comprises a neural network trained to classify a confidence of detection of different types of pathogens, sensor data representing the chemical composition and the light transparency, to cause the classifier to generate output data that indicates whether the airborne particle is likely a pathogen in the physical area, a confidence value that indicates a likelihood that the airborne particle is a pathogen, and a type of the pathogen;
receiving, from the classifier, the output data that indicates whether the airborne particle is likely a pathogen, the confidence value that indicates the likelihood that the airborne particle is a pathogen, and the type of the pathogen was likely detected;
determining whether to provide an alert given the detection of the type of pathogen, wherein the alert comprises data that indicates the type of pathogen, a list of symptoms associated with the pathogen, and a likely location of the pathogen;
for a first airborne particle from the two or more airborne particles:
determining that the output data indicates that the type of the pathogen is unknown; and
in response to determining to provide the alert given the detection of the pathogen, providing, to a device, the alert to cause the device to present the alert about the unknown pathogen; and
for a second airborne particle from the two or more airborne particles and in response to determining not to provide the alert given the detection of the pathogen, determining to skip providing the alert.

16. The computer storage media of claim 15, wherein determining whether to provide the alert using the output data that indicates the type of the pathogen comprises determining whether to provide the alert given a type of the likely pathogen.

17. The method of claim 1, wherein receiving the sensor data representing a chemical composition of an airborne particle for a physical area comprises:
receiving, from an optical sensor, the sensor data.

18. The method of claim 1, wherein selectively providing the alert comprises providing the alert that indicates the type of the pathogen, a concentration level of the pathogen, and the physical area where the pathogen was detected.

19. The method of claim 1, wherein providing, to a device, the alert comprises providing data representing a list of symptoms associated with the type of the pathogen.

20. The method of claim 1, comprising:
receiving second sensor data representing a chemical composition of a second airborne particle for a second physical area;
providing, to a classifier, the senor data and the second sensor data to cause the classifier to generate second output data that indicates whether the first and second airborne particles are likely pathogens in the physical area, the second physical area, and a type of the likely pathogens; and
in response to determining that the likely pathogens likely exists in the physical area and the second physical area, generate output data representing a type of pathogens.

* * * * *

UNITED STATES PATENT AND TRADEMARK OFFICE
CERTIFICATE OF CORRECTION

PATENT NO. : 12,198,526 B2
APPLICATION NO. : 17/878391
DATED : January 14, 2025
INVENTOR(S) : Ramy Samir Aziz ElDelgawy Page 1 of 1

It is certified that error appears in the above-identified patent and that said Letters Patent is hereby corrected as shown below:

In the Claims

In Claim 7, Column 21, Line 11, before "pathogen;" delete "likely".

In Claim 8, Column 21, Line 20, delete "comprising" and insert -- comprising: --.

In Claim 15, Column 22, Line 22, delete "transparency," and insert -- transparency --.

In Claim 16, Column 22, Line 55 (approx.), before "pathogen." delete "likely".

Signed and Sealed this
Fourth Day of March, 2025

Coke Morgan Stewart
*Acting Director of the United States Patent and Trademark Office*